(12) United States Patent
Atkin et al.

(10) Patent No.: US 6,492,995 B1
(45) Date of Patent: Dec. 10, 2002

(54) METHOD AND SYSTEM FOR ENABLING LOCALIZATION SUPPORT ON WEB APPLICATIONS

(75) Inventors: Steven Edward Atkin, Palm Bay, FL (US); Maria Azua Himmel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,212

(22) Filed: Apr. 26, 1999

(51) Int. Cl.[7] .............................................. G06F 3/00
(52) U.S. Cl. .................................. 345/703; 345/866
(58) Field of Search ............................. 345/700, 703, 345/744, 746–749, 760, 762, 764, 765, 835, 866; 709/200, 203, 213, 217, 310, 328, 329; 704/8

(56) References Cited

U.S. PATENT DOCUMENTS

| | | | | |
|---|---|---|---|---|
| 5,416,903 A | * | 5/1995 | Malcolm | 345/703 |
| 5,835,768 A | * | 11/1998 | Miller et al. | 709/320 |
| 5,900,871 A | * | 5/1999 | Atkin et al. | 345/866 |
| 5,907,326 A | * | 5/1999 | Atkin et al. | 345/866 |
| 5,913,033 A | * | 6/1999 | Grout | 709/219 |
| 5,917,484 A | * | 6/1999 | Mullaney | 345/703 |
| 6,025,836 A | * | 2/2000 | McBride | 345/750 |

\* cited by examiner

Primary Examiner—Crescelle N. dela Torre
(74) Attorney, Agent, or Firm—Leslie A. Van Leeuwen; Bracewell & Patterson, L.L.P.

(57) ABSTRACT

A method and system for enabling localization support on Web applications in response to an activation of a locale object is disclosed. The system updates a Web browser's localization parameters in response to dragging and dropping the locale object containing client localization information content onto the Web browser. Additionally, the Java virtual machine within the Web browser updates its locale information and reformats all its applets based on the localization information content. The Web browser then sends a locale event message and the localization information content to a server. The server updates its locale information and associated server side Java virtual machine and further uses the localization information for all the Java servlets within the server side Java virtual machine. The server then formats and delivers an HTML for display to the client based on the localization information content.

11 Claims, 5 Drawing Sheets

METHOD AND SYSTEM FOR ENABLING LOCALIZATION SUPPORT ON WEB APPLICATIONS

CROSS-REFERENCE TO RELATED APPLICATIONS

The subject matter of this application is related to U.S. Pat. No. 5,900,871 titled "System And Method For Manging Multiple Cultural Profiles In An Information Handling System," filed on Mar. 10, 1997 and issued on May 4, 1999 to Atkin et al., and to U.S. Pat. No. 5,907,326 titled "System And Method For Utilizing Context Sensitive Profiles In An Information Handling System" filed on Mar. 10, 1997 and issued on May 25, 1999 to Atkin et al. The foregoing applications are assigned to a common assignee with this application.

BACKGROUND OF THE INVENTION

1. Technical Field

The present invention is directed to an improved method and system for providing localization information in web based applications. Still, more particularly, the present invention relates to an improved method and system for dynamically updating Web browser's localization parameters based on a locale object created by a client.

2. Description of the Related Art

Software products have obtained a global marketplace. To obtain an international presence, software programs must be modified to fit the foreign market. Internationalization is the process of removing language and cultural dependencies from a software application. How well a developer internationalizes its application may become the single biggest factor in determining the success or failure of an organization's products overseas.

Web content providers currently face several problems related to internationalization. Most of these issues revolve around providing sufficient and accurate localization to their web content. End users expect web content to be presented in a manner appropriate for their language and cultural norms. These include the presentation of monetary quantities, numeric quantities, dates, time, and the like. These issues are only compounded by the lack of localization support in Web browsers. Web browsers' currently only address the display of text. They do not provide support for providing dynamic localization. This is a huge problem affecting content providers that wish to support the multi-national marketplace. To work around these problems, content providers must create specific solutions for each country and language.

Therefore, a need exists for dynamically updating a Web browser's localization parameters based on a locale object created by a client. The subject invention herein, solves this problem in a unique and novel manner not previously known in the art.

SUMMARY OF THE INVENTION

The method and system of the present invention updates a Web browser's localization parameters in response to dragging and dropping a locale object containing client localization information content onto the Web browser. Additionally, the Java virtual machine within the Web browser updates its locale information and reformats all its applets based on the localization information content. The Web browser then sends a locale event message and the localization information content to a server. The server updates its locale information and associated server side Java virtual machine and further uses the localization information for all the Java servlets within the server side Java virtual machine. The server then formats and delivers an HTML for display to the client based on the localization information content.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1A:
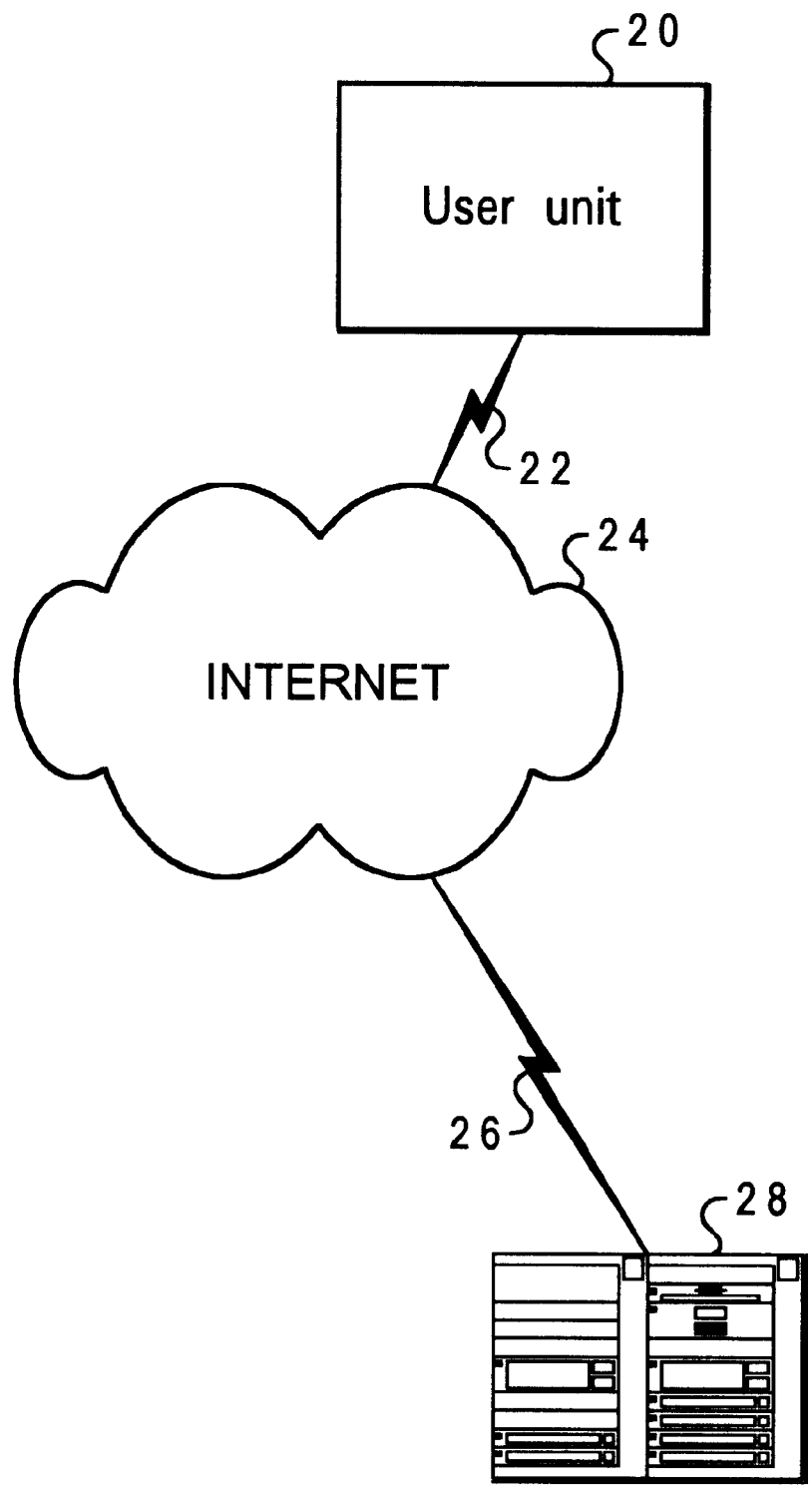
FIG. 1A depicts a network for data processing systems in which a preferred embodiment of the present invention may be implemented.

With references now to the figures, and in particular with reference to FIG. 1, a network for data processing systems in which a preferred embodiment of the present invention may be implemented is depicted. The exemplary embodiment depicted includes a client 20 connected via communications link 22 to the Internet 24. Communications link 22 may, for example, be in the form of access provided by an Internet service provider (ISP). Client 20 includes a Java-enabled browser application, allowing client 20 to retrieve and display information formatted in accordance with the HyperText Markup language (HTML) and to run Java applets.

Also connected to Internet 24, via communications link 26, is server 28. Server 28 is a World Wide Web (WWW, often simply referred to and referred hereinafter as "the Web") server capable of receiving and serving HyperText Transmission Protocol (HTTP) requests. Client 20 may retrieve HTML-formatted data from server 28 and display such information, executing Java applets in connection with such retrieval and/or display. Java applets thus executed are provided in accordance with a preferred embodiment of the present invention.

Object oriented programming has established itself as an important methodology in developing high quality, readable code. The present invention utilizes a dynamic object oriented locale object that expands the currently defined notion of a locale by encapsulating localization information onto a Web browser, thereby enabling the Web browser to be internationalized. The locale object extends the Web Browser to allow for different cultural attributes, such as, for example, language, date, time, currency, etc. The language used to implement the present invention may be for example C++ for OS/2 and the concepts of software programming, especially in object oriented programming, as detailed in U.S. Pat. No. 5,361,350, entitled "Object Oriented Method Management System and Software for Managing Class Method Names in a Computer System", commonly assigned to the Assignee of the present invention and herein incorporated by reference for all purposes. Also, other programming languages may be used in accordance with the teachings of the present invention.

Figure 1B:
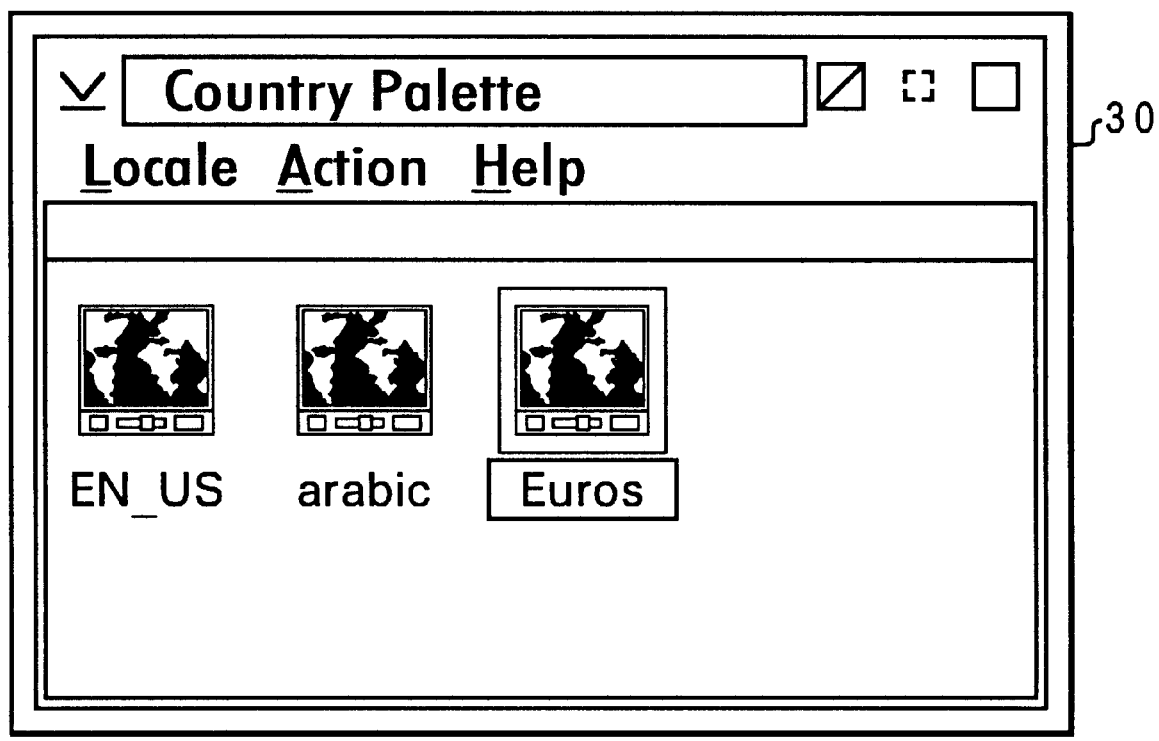
FIG. 1B depicts a dialog box illustrating a graphical user interface for a locale object for use with the present invention.
Figure 2:
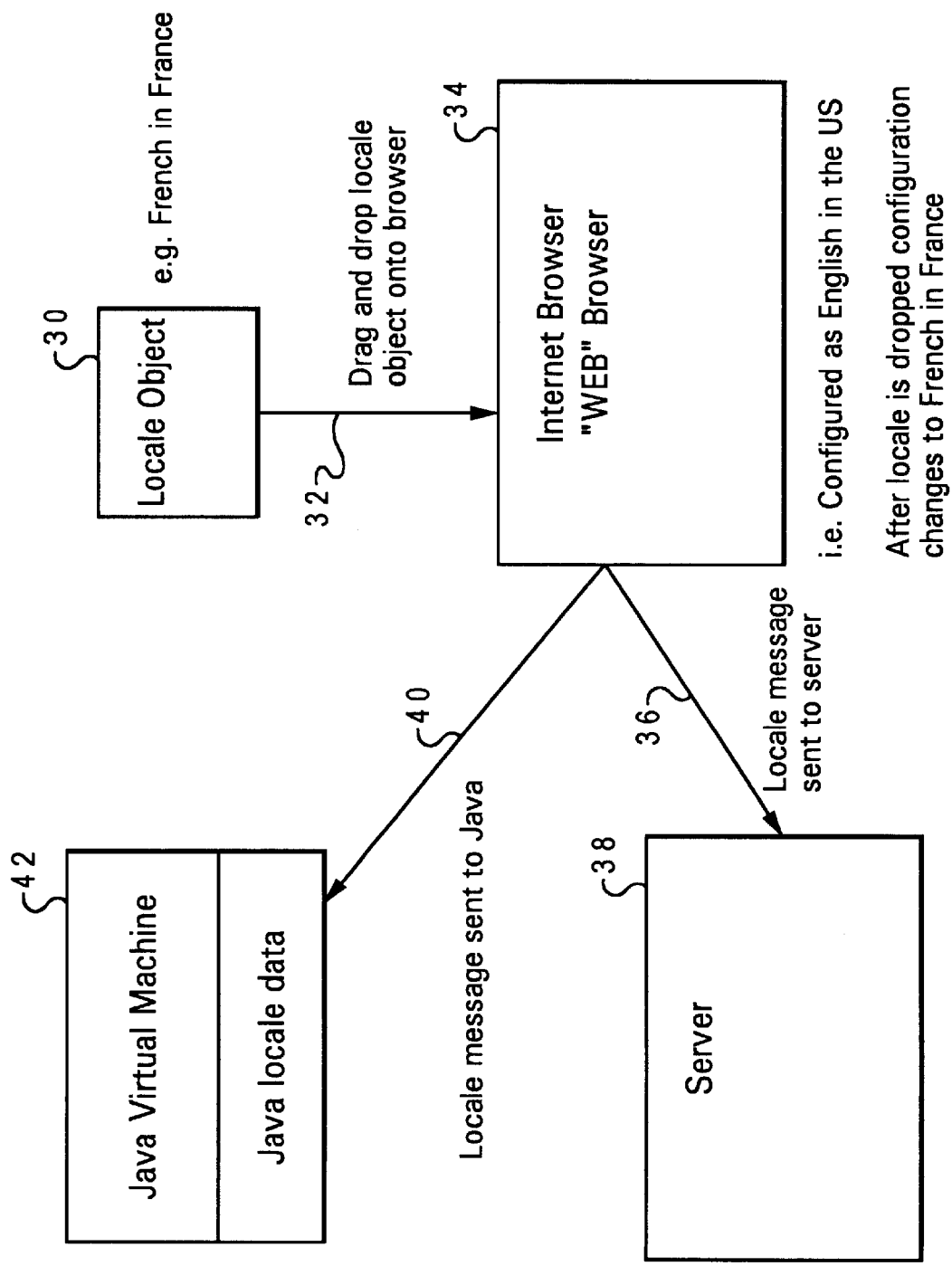
FIG. 2 is a high-level block diagram showing the method of allowing Web browsers to dynamically change there localization information.

Referring now to FIG. 2, there is shown a high 1513-level block diagram showing the method of allowing Web browsers to dynamically change there localization information. The present invention uses a locale object to update the localization parameters of a Web browser. By way of example, but not of limitation, the present invention takes advantage of the features found in the OS/2 Graphical Locale Builder, owned by the Assignee of the present invention and herein incorporated by reference for all purposes. The Graphical Locale Builder allows end users to create locale objects dynamically on a client, as shown in block 30 and by way of example, but not of limitation, the locale object 30 shown in FIG. 2 is for providing French localization information. FIG. 1B depicts a dialog box illustrating a graphical user interface for locale object 30. The locale object 30 may then be used, shown by arrow 32, by simply dragging and dropping the locale object 30 on top of a Web browser 34, as taught in U.S. patent application Ser. No. 08/519,331, entitled "Dynamic Object Oriented Extended Locale Object," as previously incorporated by reference.

The local object 30 when dragged and dropped on Web browser 34 causes the Web browser 34 to change its localization information dynamically, in this case to French. This allows the Web browser 34 to automatically set the Java VM with the correct localization parameters. The locale object information can also be stored within the Web browser 34 to be sent as hidden parameters to servers that request localization information. The availability of client localization information to Web servers resolves the current localization deficiencies in Web based applications. By dragging and dropping locale objects, content provides can avoid asking several questions to customers when ordering products "which language do you want to interact in ?", "which language version do you wish to download?", "which currency would you like to see the price?", etc. Also by enabling this technology dynamic HTML engines can generate HTML pages with correct localization information from the client on the fly.

The locale object 30, upon client request may provide the following localization information. "Day," which is a string containing the name of a day given a particular day of the week. "Month," which is a string containing the name of a month given a particular month of the year. "Date," which is a formatted string containing a date given a particular day, month, and year. "Time," which is a formatted string, containing a time given hours, minutes, and seconds. "Currency symbol," which is string containing the international currency identifier for the current locale. "Decimal," which is a string containing the symbol used to separate fractional quantities from whole quantities from the current locale. "Thousands," which is a string containing the symbol used to separate multiples of 1,000. "Sign," which is a string containing the symbol used to represent positive and negative quantities for the current locale. "Fractional quantities," which is a number representing the number of digits to display after the decimal point in monetary quantities. "Menu," when a given request for a standard menu bar occurs, the operating system returns a translated common user access (CUA) menu bar. "String," where given a specific request for a pre-defined operating system string, the operating system returns a translated string based upon the current locale.

Locale changes are performed through the use of a customization change daemon, also called a locale change daemon in the internationalization/localization procedure, which is a thread that intermittently awakens to perform some tasks and then goes back to being blocked. The locale change daemon takes the form of the drag and drop graphical user interface 30 shown in FIG. 1B. The locale change daemon 30 stays suspended until a user clicks on it with a mouse operation. When the daemon 30 is awaken, a locale change may take place by simply dragging one of the locale change flags and dropping it on top of a graphical user interface for the Web browser 34.

Figure 3:
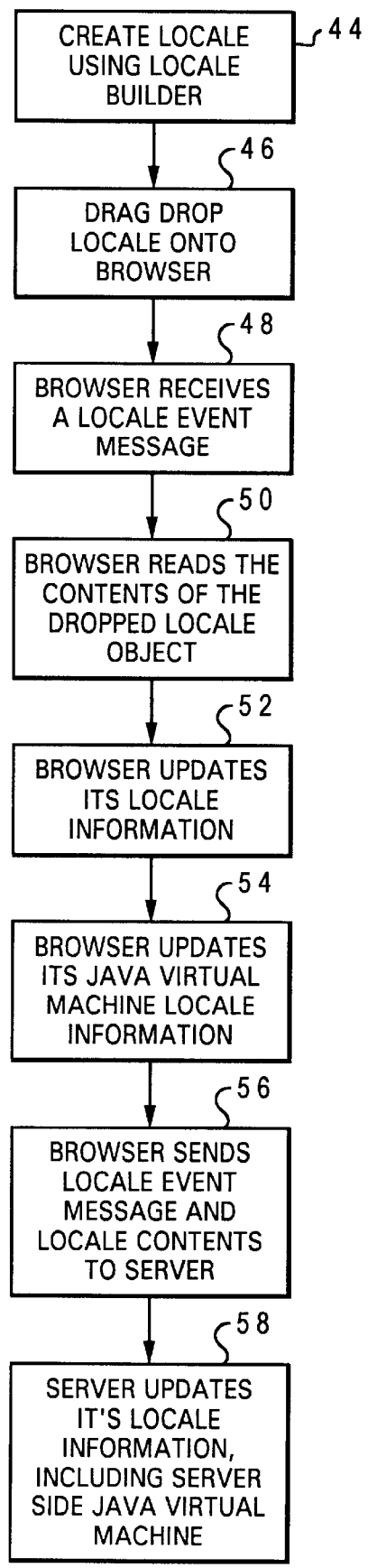
FIG. 3 depicts an overall flowchart for the method in accordance with the present invention.
Figure 4:
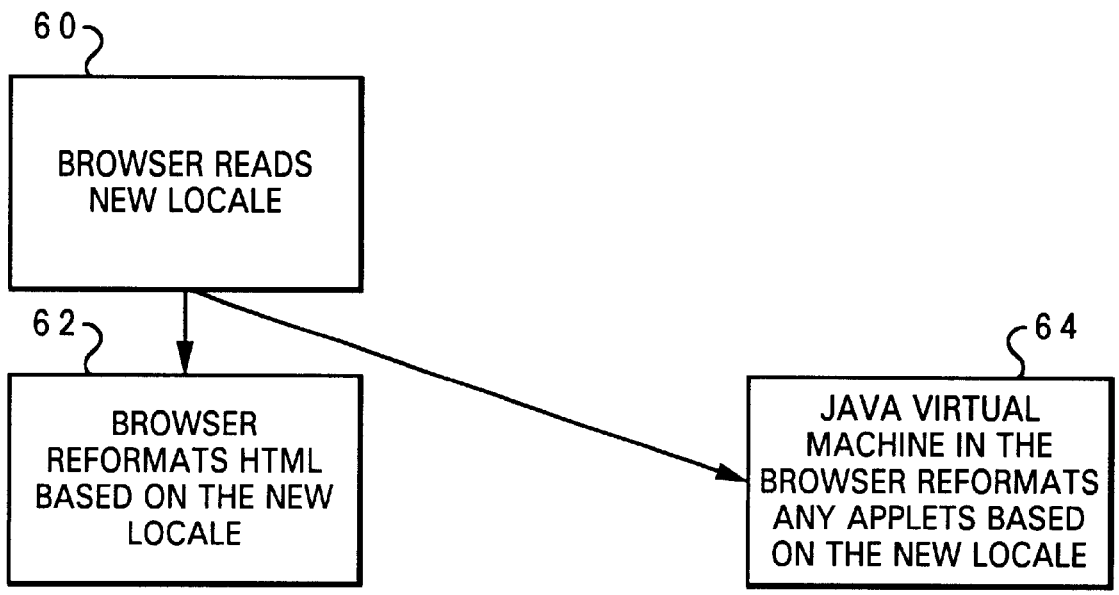
FIG. 4 is a detailed block diagram for updating localization information of the Web browser as depicted in FIG. 3.

Referring now to FIG. 3, there is depicted an overall flowchart for updating localization information in accordance with one preferred embodiment of the present invention. As shown in step 44, a locale object is created by a client using the aforementioned Graphical locale builder, and as described before, in step 46 is dragged and dropped onto a graphical user interface for Web browser 34. The Web browser 34 receives a locale event message in step 48 from the dropped locale object 30. Next, in step 50 and 52, the Web browser 34 reads the contents of the dropped locale object 30 and updates its localization information. Referring to FIG. 4, there is illustrated a detailed block diagram for updating the localization information of the Web browser 34. As shown in FIG. 4, blocks 60 and 62, the Web browser 34 reads the localization information content and reformats its HTML in response to and based on this localization information content. Turning back to FIG. 3, the Web browser 34 then updates the locale information for a Java virtual machine 42 (depicted in FIG. 2), within the Web browser 34, as shown in step 56. Additionally, all applets based on the localization information within the Java virtual machine 42 are reformatted, as shown in block 64 of FIG. 4. This process is further depicted in FIG. 2 showing a locale message 40 sent from the Web browser 34 to the Java virtual machine 42.

Figure 5:
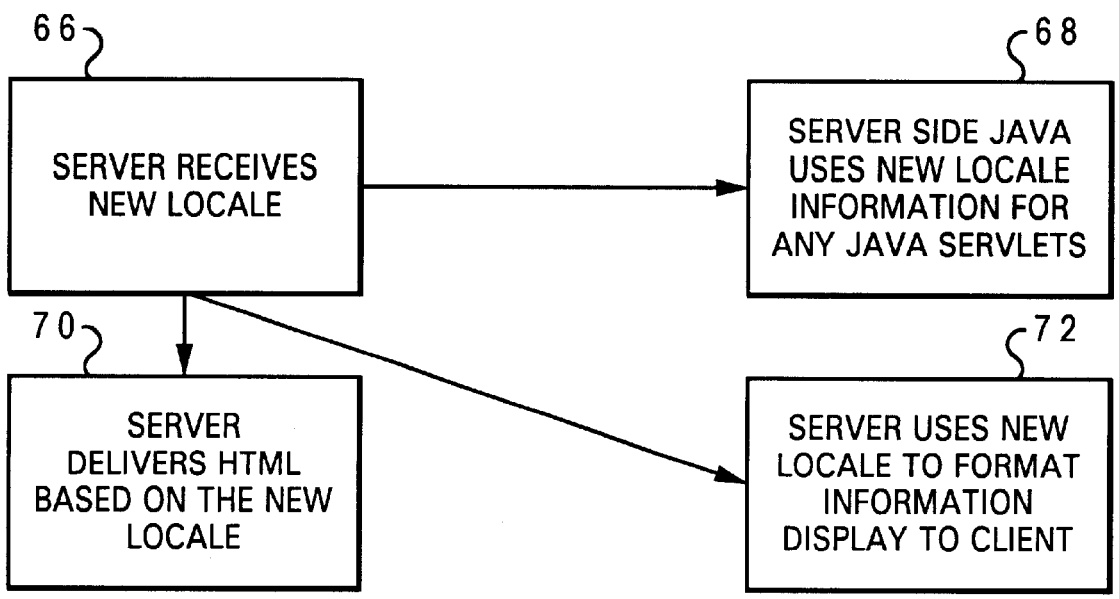
FIG. 5 is a detailed block diagram for updating localization information of the server as depicted in FIG. 3.

Turning once again to FIG. 3, the process proceeds and finishes in step 58, by the Web browser 34 sending a locale event message 36 and the localization information content to a server 38, as shown in FIG. 2. The server 38 then updates its locale information including its server side Java virtual machine (not shown). FIG. 5 depicts a detailed block diagram for updating the localization information at server 38. As shown in block 66, when the server 38 receives the localization information content it uses the locale information for all Java servlets within its server side Java virtual machine, as shown in block 68. Lastly, the server 38 may then format and deliver an HTML for display to the client based on the locale information, as shown in blocks 70 and 72.

It should be appreciated that the present invention updates a Web browser's localization parameters in response to a locale object containing client localization information wherein the Java virtual machine within the Web browser updates its locale information and reformats all its applets based on the localization information content. The Web browser sends a locale event message and the localization information content to a server. The server updates its locale information and associated server side Java virtual machine and further uses this localization information for all the Java servlets within the server side Java virtual machine. The server then formats and delivers an HTML for display to the client based on the localization information content.

It is also important to note that although the present invention has been described in the context of fully providing functional localization support in Web applications, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for utilizing a locale object, which contains localization information content, to enable network localization support for document display information delivered from a server to a client, said method comprising the steps of:
    activating said locale object within said client by dragging and dropping a graphical user interface for said locale object onto a graphical user interface for a Web browser;
    responsive to said activating said locale object within said client, receiving a locale event message from said dropped locale object;
    responsive to receiving said locale event message:
        reading said localization information content of said dropped locale object by said Web browser;
        updating document display information within said Web browser in accordance with said localization information content of said dropped locale object, and
        sending said locale event message and said localization information content from said client to said server; and
    responsive to receiving said locale event message and said localization information content from said client, updating locale information for said server and an associated server side Java virtual machine in accordance with said localization information content, such that HTML documents retrieved by said Web browser from said server are formatted in accordance with said localization information content.

2. The method of claim 1, wherein said updating document display information within said Web browser further comprises the step of:
    updating locale information for a Java virtual machine within said Web browser in accordance with said localization information content within said locale object.

3. The method of claim 2, wherein said updating locale information for a Java virtual machine within said Web browser further comprises the step of:
    reformatting all applets based on said localization information content within said Java virtual machine.

4. The method of claim 1, when said updating said server side Java virtual machine's locale information further comprises the step of:
    using said localization information content for all Java servlets within said server side Java virtual machine.

5. The method of claim 4, wherein said updating said server's locale information is followed by the step of:
    formatting and delivering an HTML document for display to said client based on said localization information content.

6. A system for utilizing a locale object, which contains localization information content, to enable network localization support for document display information delivered from a server to a client, said system comprising:
    means for activating said locale object within said client by dragging and dropping a graphical user interface for said locale object onto a graphical user interface for a Web browser;
    means responsive to said activating said locale object within said client for receiving a locale event message from said dropped locale object;
    means responsive to receiving said locale event message for:
        reading said localization information content of said dropped locale object by said Web browser;
        updating document display information within said Web browser in accordance with said localization information content of said dropped locale object; and
        sending said locale event message and said localization information content from said client to said saver; and
    means responsive to receiving said locale event message and said localization information content from said client, for updating locale information for said server and an associated server side Java virtual machine in accordance with said localization information content, such that HTML documents retrieved by said Web browser from said server are formatted in accordance with said localization information content.

7. The system of claim 6, further comprising:
    means for updating locale information for a Java virtual machine within said Web browser in accordance with said localization information content within said locale object.

8. The system of claim 7, comprising:
    means for reformatting all applets based on said localization information content within said Java virtual machine.

9. The system of claim 6, further comprising:
    means for using said localization information content for all Java servlets within said server side Java virtual machine.

10. The system of claim 9, further comprising:
    means for formatting and delivering an HTML document for display to said client based on said localization information content.

11. A computer product residing on a computer usable medium for utilizing a locale object, which contains localization information content, to enable network localization support for document display information delivered from a server to a client, said computer program product comprising:
    instruction means for activating said locale object within said client by dragging and dropping a graphical user interface for said locale object onto a graphical user interface for a Web browser;
    instruction means responsive to said activating said locale object within said client for a reading a locale event message from said dropped locale object;
    instruction means responsive to reading said locale event message for:

updating document display information within said Web browser in accordance with said localization information content of said dropped locale object; and sending said locale event message and said localization information content from said client to said server; and instruction means responsive to receiving said locale event message and said localization information content from said client, for updating locale information for said server and an associated server side Java virtual machine in accordance with said localization information content, such that HTML documents retrieved by said Web browser from said server are formatted in accordance with said localization information content.

* * * * *

UNITED STATES PATENT AND TRADEMARK OFFICE
CERTIFICATE OF CORRECTION

PATENT NO.    : 6,492,995 B1
DATED         : December 10, 2002
INVENTOR(S)   : Atkin et al.

It is certified that error appears in the above-identified patent and that said Letters Patent is hereby corrected as shown below:

Column 3,
Lines 14-15, please delete "a high 1513-level block diagram…" and replace with -- a high-level block diagram --.

Column 6,
Line 27, please replace "to said saver" with -- to said server --.

Signed and Sealed this

Fifth Day of August, 2003

JAMES E. ROGAN
*Director of the United States Patent and Trademark Office*